United States Patent [19]
Pao et al.

[11] 3,875,400
[45] Apr. 1, 1975

[54] INTENSITY MODULATED OPTICAL CARRIER COMMUNICATION SYSTEM

[76] Inventors: Yoh-han Pao, 2721 Scarborough Rd., Cleveland Heights, Ohio 44106; Jonathan P. Freeman, 3855 Mells Rd., Dorset, Ohio 44032; John W. Allen, 1815 Garfield Rd. No. 303B, E. Cleveland, Ohio 44112

[22] Filed: Sept. 6, 1973

[21] Appl. No.: 394,884

Related U.S. Application Data

[63] Continuation-in-part of Ser. No. 131,616, April 6, 1971, abandoned.

[52] U.S. Cl. ............ 250/199, 332/7.51, 350/160 R
[51] Int. Cl. ............ H04b 9/00
[58] Field of Search ............ 250/199, 201, 225; 332/7.51; 350/160 R; 307/296, 297

[56] References Cited

UNITED STATES PATENTS

| | | | |
|---|---|---|---|
| 2,557,974 | 6/1951 | Kibler | 250/199 |
| 2,858,421 | 10/1958 | Touvet | 250/199 |
| 3,050,630 | 8/1962 | Bird | 250/199 |
| 3,302,027 | 1/1967 | Fried et al. | 250/199 |
| 3,327,121 | 6/1967 | Thomas | 250/199 |
| 3,328,723 | 6/1967 | Giordmaine et al. | 332/7.51 |
| 3,433,958 | 3/1969 | Lenzo et al. | 250/199 |
| 3,469,087 | 9/1969 | Seaton | 250/199 |
| 3,524,147 | 8/1970 | Soffer et al. | 332/7.51 |
| 3,579,145 | 5/1971 | De Lange | 332/7.51 |

*Primary Examiner*—Felix D. Gruber
*Attorney, Agent, or Firm*—Sughrue, Rothwell, Mion, Zinn and Macpeak

[57] ABSTRACT

A low-cost, reliable optical communications system and method, a feature of which is the use of an optical carrier beam which is intensity modulated at radio frequencies above one MHz and below the microwave range to produce a radio frequency subcarrier on the optical carrier. The radio frequency subcarrier is angle modulated, either in frequency or phase, for signal transmission. The frequency or phase modulation at radio frequencies insures high immunity to adverse atmospheric conditions, such as rain, snow, fog and turbulence. Other features include the maintenance of the subcarrier operating point by reversing the polarity of the voltage on the electro-optic crystal without changing the absolute magnitude of the voltage and the manner of locking the transmitter onto the receiver.

12 Claims, 12 Drawing Figures

YOH-HAN PAO, JONATHAN P. FREEMAN
JOHN W. ALLEN, INVENTORS
BY Sughrue, Rothwell, Mion, Zinn & Macpeak
ATTORNEYS INVENTORS
YOH-HAN PAO
JONATHAN P. FREEMAN
JOHN W. ALLEN
BY Sughrue, Rothwell, Mion, Zinn & Macpeak
ATTORNEYS

ERROR VOLTAGE

HYSTERESIS LOOP OF HIGH WINDOW DETECTOR

BIAS VOLTAGE

INTENSITY MODULATED OPTICAL CARRIER COMMUNICATION SYSTEM

CROSS-REFERENCE TO RELATED APPLICATION

This application is a continuation-in-part of copending application Ser. No. 131,616, filed Apr. 6, 1971, by Yoh-Han Pao et al. for "Intensity Modulated Optical Carrier Communication System" and now abandoned.

BACKGROUND OF THE INVENTION

1. Field of the Invention

The invention relates generally to the field of optical communications and, more particularly, to such a communication system in which a frequency-modulated or phase-modulated subcarrier in the radio frequency range above one MHz and below the microwave range is superimposed upon a light beam carrier.

2. Description of the Prior Art

In recent years there have been tremendous developments in light sources and optical devices. However, the early claims that optical communications would immediately revolutionize communication practice by permitting the transmission of enormous amounts of information have yet to be realized. In the opinion of experts knowledgeable in the art, "Indeed the early, relatively naive, optimism has now been replaced with an acute awareness of the serious problems that must be overcome before communication at optical frequencies is to be practical," and "At the present time, the capabilities of most optical communication systems are limited primarily by the characteristics and cost of the available devices." (See Proceedings of the IEEE, Special Issue on Optical Communication, October, 1970, Editorial Comment by Editorial Committee). These opinions are indeed borne out by the fact that all of the 10 "operational" systems reviewed in a separate article are high-cost, sophisticated systems which strain the capabilities of extremely rapid electronics merely to carry one television channel. (See Frank F. Goodwin, "A Review of Operational Laser Communication Systems," Proceedings of the IEEE, Volume 58, No. 10, October, 1970, pp. 1,746–1752.)

The deleterious effect of the earth's atmosphere is illustrated very dramatically by means of a pulse transmission experiment. In this experiment, a train of laser pulses, all of a fixed height, was transmitted through the earth's atmosphere and detected by a photo detector located at a site remote from the transmitting site. It was found that the output of the photo detector did not consist of a train of pulses having uniform height as did the transmitted pulses, but rather that there was a great variation in the height of the pulses received by the photo detector. The cause for this non-uniformity in pulse height was not due to the photo detector characteristics, but rather to the weather in the atmosphere through which the pulses were transmitted. This was proved by photodetecting the transmitted pulses at a location very close to the transmitting site in which case the pulses were essentially all of a uniform height. This experiment proved, therefore, that any amplitude or intensity modulation method for transmission of information in an optical system is likely to be very unsatisfactory, and this conclusion has indeed been borne out in practice.

In the same experiment, it was observed that the pulse width was not as susceptible to change by weather as was the pulse height and similarly polarization of the light carrier was not greatly changed either. These two observations have encouraged designers of optical communication systems to favor the use of pulse code modulation. In such a modulation scheme, digital data is transmitted by detecting the width of the pulses or by detecting the polarization of the pulses. In such modulation schemes, a binary 1 might correspond to a certain width or a certain polarization and a binary 0 might correspond to another width or polarization. Such schemes are suitable for transmission of digital data and have low error rates. However, the problem with such schemes is that information bandwidths are rather narrow. The importance of this limitation may be realized by considering the transmission of all the signals contained in one television channel including both sound and video signals. For example, if the information bandwidth is assumed to be 5 MHz, the sampling rate must be at least 10 megasamples per second. If it is assumed that each analog signal is represented by five bits of binary data, which corresponds to a very modest resolution, then the transmission rate becomes 50 megabits per second merely to transmit one television channel. Therefore, such modulation schemes can be successful only with the use of a large number of very expensive components.

In another prior art scheme, the optical carrier source is chosen to be a coherent light source, such as a laser, operating in a single mode. The coherent light beam is then frequency-modulated at optical frequencies at the transmitter, and at the receiving end the beam is heterodyned with the output of a stable local oscillator, also a laser device; the information signal is recovered in the form of a beat signal between the two optical frequencies, i.e., between the transmitter modulator frequency and the receiver local oscillator frequency. One disadvantage of such a system is that the light coherence must be very high, which means that infrared lasers must be used. Another disadvantage is that bad weather so distorts the wavefront, that in fact a good deal of the transmitter coherence is lost over long distances in adverse weather. Although such optical frequency modulated systems may be suitable for space communications, such systems are too expensive and quite unsatisfactory for use in bad weather for transmission between two earth stations.

In still another prior art scheme, the information signal is first frequency-modulated onto a 1.5 gigaHz microwave subcarrier. (See H. V. Vance, C. Ohlmann, D. G. Peterson, R. B. Ward and K. K. Chow, "Ultra-Wide Bandwidth Laser Communications: Part II-An Operating Laboratory System" Proceedings IEEE, Vol. 58, No. 10, pages 1,714–1,719.) This FM subcarrier is then intensity modulated onto a laser beam by means of a gigaHz bandwidth electro-optic modulator. The frequency-modulated/intensity-modulated signal on the laser is then demodulated in an optical receiver by means of a fast response photo detector and a gigaHz bandwidth discriminator. Although such a system has an extremely wide bandwidth, it is inherently a complex and expensive system, and moreover, it suffers from the effects of multipath transmission and is, therefore, not as immune to the effects of very bad weather as compared to the system of the present invention. The deleterious effects of multipath transmission may be described in the following way. In order to avoid excessive spreading of an optical beam in transmissions over a long path, it is customary to use transmitting optics to enlarge the diameter of the outgoing beam as much as possible. Either because of this or because of excessive divergence due to the use of a smaller lens, portions of a wavefront having initially the same phase may travel through areas of different refractive index and therefore be out of phase at the receiver. Consequently, information which is being transmitted in the form of a phase or frequency modulated signal is degenerated by the noise caused by the multipath transmission which is in turn caused by the differences or changes in the index of refraction of the propagation path.

The period in seconds of the subcarrier frequency is $T_{sc} = 1/\nu_{sc}$ where $\nu_{sc}$ is the subcarrier frequency in cycles per second. Let the average effective difference in the refractive index between the different optical paths over the entire transmission path be $\Delta n$ and the average index of refraction of the different optical paths be $n_{ave}$. Then the time delay $\Delta t$ introduced due to the multipath effect is:

$$\Delta t = (\Delta n/n_{ave}) \cdot (L/c)$$

where $L$ = the transmission path length in meters, $c$ = the speed of light = $3 \cdot 10^8$ meters per second, and $\Delta t = 3.33 \cdot 10^{-9}\, \Delta n L$ Typically, $\Delta n$ is between $10^{-5}$ and $10^{-6}$. As an example, when $L$=10 Kilometers and $\Delta n = 10^{-6}$, $$\Delta t = 3.33 \cdot 10^{-11} \text{ seconds, and}$$

when $\Delta n = 10^{-5}$, $$\Delta t = 3.33 \cdot 10^{-10} \text{ seconds.}$$

If the acceptable range of $\Delta t \leq 1/100$ of $T_{sc}$, then for a subcarrier frequency is two gigaHz, the period is $$T_{sc} = 5 \cdot 10^{-10} \text{ seconds.}$$

Clearly then, such a time delay would be completely unacceptable in this range of subcarrier frequencies.

SUMMARY OF THE INVENTION

In contrast to these prior art systems, the present invention makes use of standard, well-proven, low-cost components in an unusual and unobvious manner to produce an optical communication system which is unexpectedly highly immune to adverse effects of the earth's atmosphere or other media which are subject to changes in absorption and/or in refractive index.

Our invention may be briefly summarized as the discovery that the use of a subcarrier frequency in the radio frequency range, for example, at the frequency $3 \cdot 10^7$ Hertz or 30 MHz, as compared with a subcarrier frequency in the microwave range above one GHz as used in the prior art, produces unexpectedly improved transmission results, particularly in bad weather. As can be seen, the period of such a radio frequency subcarrier of $3 \cdot 10^7$ Hz is $T_{sc} = 3.33 \cdot 10^{-8}$ seconds, and a time delay of $3.33 \cdot 10^{-11}$ or $3.33 \cdot 10^{-10}$ seconds would certainly introduce noise but would not completely destroy the information signal as is the case when the subcarrier frequency is in the microwave range. In the reduction to practice of this invention, this result has been borne out i.e., the radio frequency subcarrier system turns out to be unexpectedly immune to highly scattering weather conditions, such as a snow blizzard.

Our investigations have shown that optical beams intensity modulated at such radio frequencies can be frequency or phase modulated for transmittal of wide band analog or digital information. The radio frequency band for the purpose of this invention is considered to be any frequency above 1 MHz and below the microwave range, i.e., below 800 MHz.

We have found that the use of a subcarrier in the radio frequency range to intensity modulate an optical source transmitter provides communications which are highly immune to bad weather conditions and is capable of transmitting information through long distances, even through snow blizzards. In all respects, our system acts as a highly directional radio frequency beam except that the light beam carrier does not interfere with electrical equipment or other electromagnetic signals at the same radio frequency as the subcarrier frequency at which the light beam is intensity modulated. We have also found that our system is extremely simple, of low cost and suitable for use in urban communities where high demand for communications capacity cannot be met by existing conventional radio and microwave channels.

A unique and unusual feature of the invention is the bias control scheme which is devised to enable the system to handle any excursion of the transfer characteristic without necessity of having the ability to impose arbitrarily large bias voltages on the crystal. There are two aspects to the bias control permitting it to operate as a small signal proportional control system and, when the control voltage reaches the maximum value but is still insufficient to increase the average light value, to operate as a bias polarity reversal switch.

Also of benefit to several embodiments of the invention is a simple scheme for providing automatic beam control making the communication substantially immune to gradients in the refractive index of the atmosphere and movements in the mounting platform of the transmitter.

It is accordingly an object of the invention to provide an extremely simple, low cost, reliable multi-channel wide band communication link which is highly directional, private, non-interfering, highly immune to bad weather conditions and also highly immune to stray light beams of the same wavelengths as the carrier light beam used in the communications link.

Another object of the invention is to provide beacon means for the reliable guidance of planes or missiles where such beacon means are immune to jamming and other countermeasures, either by radio frequencies or by light.

A further object of the invention is to provide anti-collision warning systems based on the detection of the change in the frequency of the subcarrier caused by the relative motion of two fast moving objects.

Still another object of the invention is to provide a long distance visible or invisible probe for determining the extremely small motion of objects caused by sound. This object is realized by detecting the change in frequency of the reflected subcarrier in the intensity modulated light beam.

DESCRIPTION OF THE PREFERRED EMBODIMENTS

Figure 1:
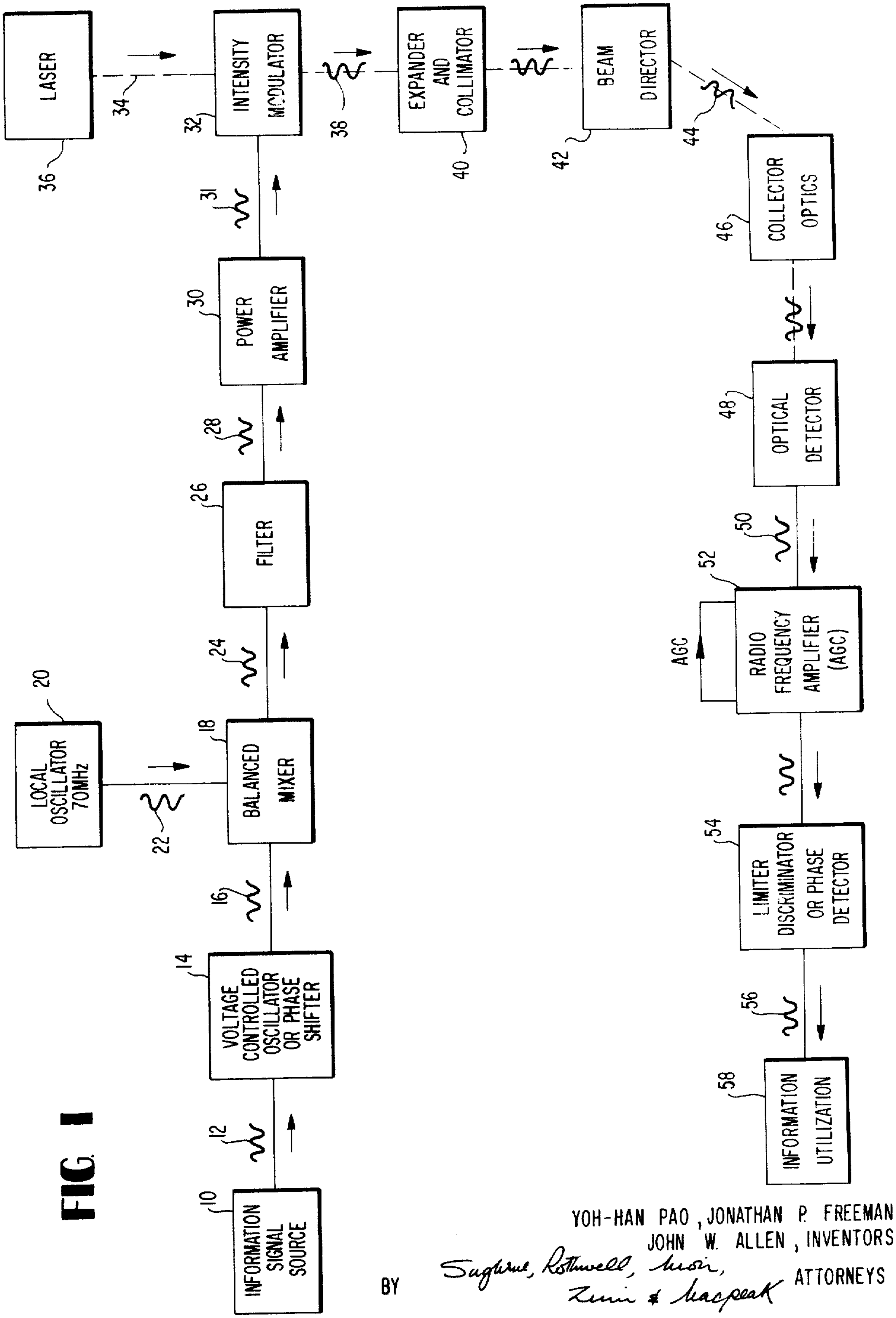
FIG. 1 is a block diagram of a communications system embodying the invention.

A preferred embodiment of the invention is illustrated in the block diagram of FIG. 1. An information signal source 10 provides an analog signal 12 which may consist for example of multichannel audio and video signals or any other form of information with a bandwidth corresponding to the other components in the system. Analog signal 12 controls the output frequency of a voltage controlled oscillator 14 which may typically have a center frequency of 100 MHz with a frequency deviation of plus or minus one MHz. In another form of the invention block 14 would be a voltage controlled phase shifter which provides a phase modulated signal rather than a frequency modulated signal. Signal 12 may also be a digital signal in which case the VCO would be shifted in frequency according to the digital format. Signal 12 may also be time and/or frequency multiplexed combinations of digital and analog signals.

The frequency or phase modulated signal from the oscillator 14 is fed to a balanced mixer 18. Also fed to mixer 18 is the output of a local oscillator 20 which supplies a mixing or heterodyning signal 22, which in the preferred embodiment may have a frequency of 70 MHz. The output 24 of mixer 18 consists of two side band subcarrier frequencies of 30 MHz and 170 MHz. A low pass filter 26 blocks the 170 MHz subcarrier frequency and passes only a signal 28 consisting of a subcarrier frequency of 30 MHz carrying the frequency or phase modulated information signal. The FM or phase-modulated subcarrier frequency signal 28 is amplified in a power amplifier 30 whose output 31 drives a transverse field optical intensity modulator 32 which may consist of a conventional electro-optic crystal in parallel with an inductor and a load resistor. This conbination provides a tuned load with a maximum impedance at 30 MHz and a very large bandwidth or low Q. In the preferred embodiment, the information signal 12 consists of a base band signal of bandwidth less than 5 MHz and the power amplifier 30 is capable of driving 10 watts into 50 ohms which is the value of the load resistor in the intensity modulator 32.

The electro-optic crystal in the intensity modulator 32 may for example be made of $KD_2PO_4$ with a quarter-wave plate and polarizer. The intensity vs. voltage characteristic for this modulator is $I = I_0 \sin^2 \pi/2\ (V/V_{\lambda/2} + \phi)$, where $I$ is the intensity of light out of the modulator $I_0$ is the maximum intensity of light out of the modulator, $V$ is the voltage across the crystal, $V_{\lambda/2}$ is the half-wave voltage of the crystal, and $\phi$ is the initial or reference angle which is characteristic of the particular crystal.

In the preferred embodiment, optical carrier beam 34 is produced by a laser 36 whose output is a highly coherent light beam. In one form the laser 36 may be a single transverse mode He-Ne laser with associated power supplies and has an output power of approximately 15 milliwatts. Other optical sources, such as light emitting diodes may be used. Of course, it is to be understood that the optical carrier may be derived from any source of coherent or incoherent light, and may in the simplest form be merely a light beam from a conventional flashlight. In the preferred form of the invention, laser 36 is an He-Ne laser operating in a single mode of $4.7 \cdot 10^{14}$Hz.

The output of the intensity modulator 32 is a radio frequency intensity-modulated laser beam 38 which is fed through expander and collimator optics 40 to an optical beam director 42 consisting of mirrors, for example. The beam then passes through a transmission path 44 in the atmosphere after which it is received by collector optics 46 in a receiving station. Optics 46 focuses the beam on an optical detector 48 consisting of, for example, a photo detector, which extracts the FM or phase-modulated radio frequency subcarrier signal from the optical carrier to produce the detected signal 50 in the form of the 30 MHz subcarrier carrying the FM or phase-modulated information signal. Signal 50 is amplified in a suitable automatic gain controlled radio frequency amplifier 52 whose output is applied to a limiter discriminator 54 which, for a frequency modulated signal, extracts the information signal from the 30 MHz subcarrier. If the information is in the form of phase modulation rather than frequency modulation then of course it is understood that block 54 represents a phase detector. The demodulated information signal 56 from the discriminator or phase detector 54 is then applied to a suitable information utilization device 58.

As pointed out previously, the improvement which this invention offers over the prior art is the use of a frequency modulated or phase modulated subcarrier in the radio frequency range, i.e., above one MHz and below 800MHz, as compared to the prior art technique of using a microwave subcarrier frequency.

In the broadcast aspect of the invention, the radio frequency subcarrier frequency is contemplated to be any radio frequency below the microwave range, i.e., any frequency above one MHz and below about 800 MHz. However, more specifically the subcarrier frequency range is contemplated as a practical matter to be generally less than 200 MHz and in most cases would probably be in the range from 1 MHz to 50 MHz.

As alluded to previously, we obtained completely unexpected results by using a phase modulated or frequency modulated subcarrier frequency in the radio frequency range as opposed to the prior art microwave range. More particularly, as contrasted to prior art communications system, it was found that the art optical system embodying the present invention was highly immune to bad weather conditions and, in particular, to severe rain and snowstorms which cause extreme variations in the refractive index of the atmosphere.

These variations cause such severe noise in prior art microwave intensity modulated optical carrier systems that the signal is effectively destroyed. By comparison, we found that the use of a frequency or phase-modulated radio frequency subcarrier for intensity modulating an optical transmitter source resulted in an optical communication system which is highly immune to the noise effects caused by such severe weather conditions.

Those skilled in the art would expect a marginal performance from such a radio frequency subcarrier system because it was thought that the lower subcarrier frequency would not permit sufficiently wideband modulation, and furthermore such a system would not maintain linearity. However, we found that any non-linearity which does exist does not show up significantly in the final performance of this system. For example, in black and white television transmission only relative shades of gray are affected. By contrast, the tremendous improvement obtained by this invention is a very high degree of immunity of the optical communication against very bad weather conditions.

Figure 2:
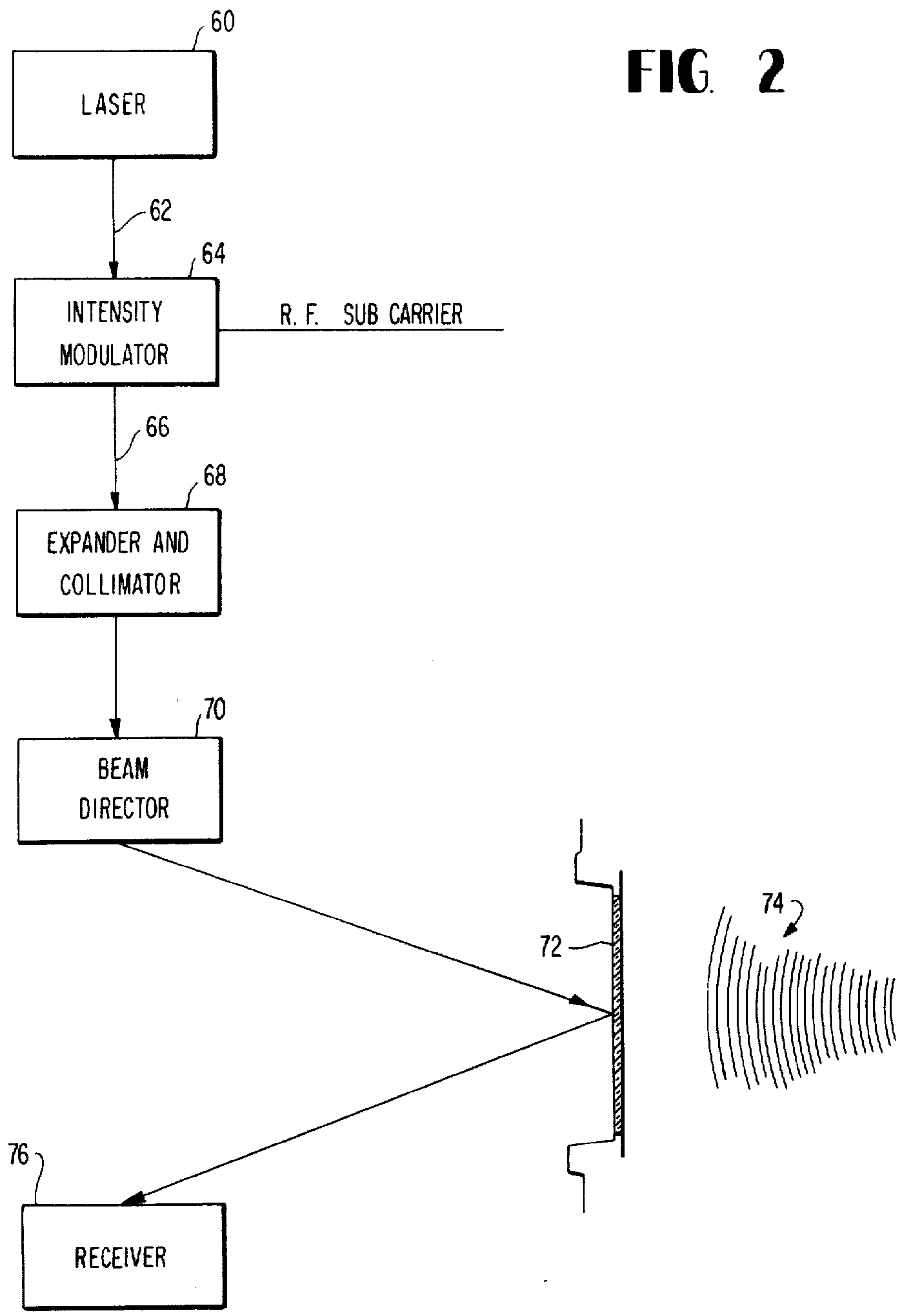
FIG. 2 is a block diagram of another embodiment of the invention.

In another embodiment of the invention employing the same principles, we found that we could provide an extremely sensitive probe for detecting mechanical movement occurring at distances quite remote from the transmitter. For example, it was found that the intensity modulated light beam can be directed against the window of a room in which conversation is taking place. The window pane vibrations caused by the sound waves of the conversation phase-modulates the R.F. subcarrier on the intensity modulated optical beam. The reflected beam is then detected to derive an audio information signal which clearly reproduces the conversation being conducted in the room. This embodiment of the invention is illustrated schematically in FIG. 2. Again, an optical carrier source such as a laser 60 produces a laser carrier beam 62 which is fed together with an R.F. subcarrier signal into a light intensity modulator 64 which produces an intensity modulated laser beam 66 modulated at the R.F. subcarrier frequency. The modulated carrier beam is fed through expander and collimator optics 88 and then to a beam director 70 which directs the beam against the window pane 72 which is subjected to sonic vibrations, such as 74 caused by conversation. The vibrating window pane phasemodulates the R.F. subcarrier beam on the optical carrier beam which is then reflected from the window and processed and detected in a suitable receiver apparatus 76 containing an audio detector and transducer which reproduce the sound which is causing the vibrations.

In another embodiment of the invention, aircraft approaching a landing field are each assigned a different unique subcarrier frequency identifying that aircraft and providing a unique voice communication channel which is detected by a suitable photodetector means in a receiver in the control tower. Such a guidance and communication system is immune to bad weather conditions and is not subject to interference from electromagnetic radiations or other optical radiations.

Similarly, in another embodiment, an anti-collision warning system is provided by the detection of the change in frequency of the subcarrier as caused by the relative motion of two fast moving objects.

Common to each of the several embodiments is the provision of a unique and unusual bias control system.

This system maintains the bias in a stable manner without resorting to expensive and bulky mechanical and thermal ways of maintaining the desired operating condition. Although the following discussion is primarily in terms of electro-optic modulation, the basic concept and techniques taught are applicable also to many other types of modulators with similar transfer characteristics.

Figure 3:
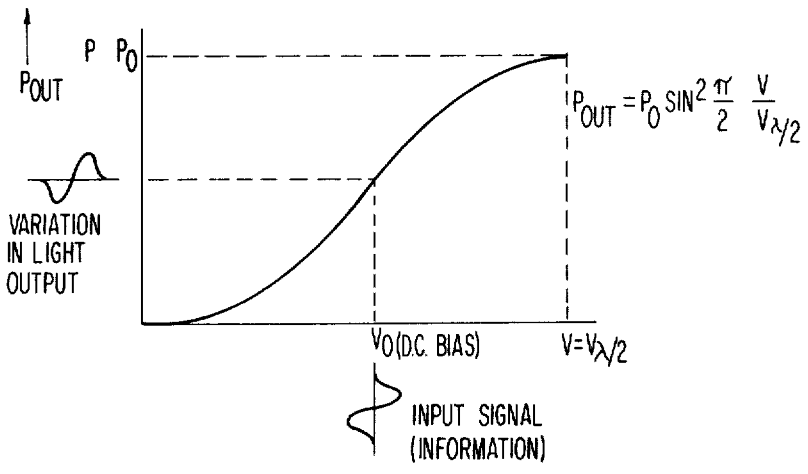
FIG. 3 is a graph showing the variation of light output with bias voltage on the electro-optic crystal.

In the method of modulation according to the several embodiments of the invention, light from the laser is intensity modulated by a subcarrier. Information is impressed on the beam by varying the frequency (or phase) of the subcarrier. Typically such a system might be formed by passing the linearly polarized output of a laser through an electro-optic crystal and subsequently through an analyzer crossed with respect to the initial polarization of the laser output. Thus, when there is no applied voltage on the crystal, the analyzer effectively blocks all of the light and none is transmitted. As the applied voltage is increased, the linearly polarized light is converted into elliptically polarized light and the transmitted component begins to increase. At a certain voltage called the halfwave voltage ($V_{\lambda/2}$), the light leaving the electro-optic crystal is again linearly polarized but with the plane of polarization rotated 90° with respect to the initial direction. At that point, all of the light is passed through the analyzer. The manner in which the intensity of the transmitted light varies with applied voltage is shown in FIG. 3.

Figure 4:
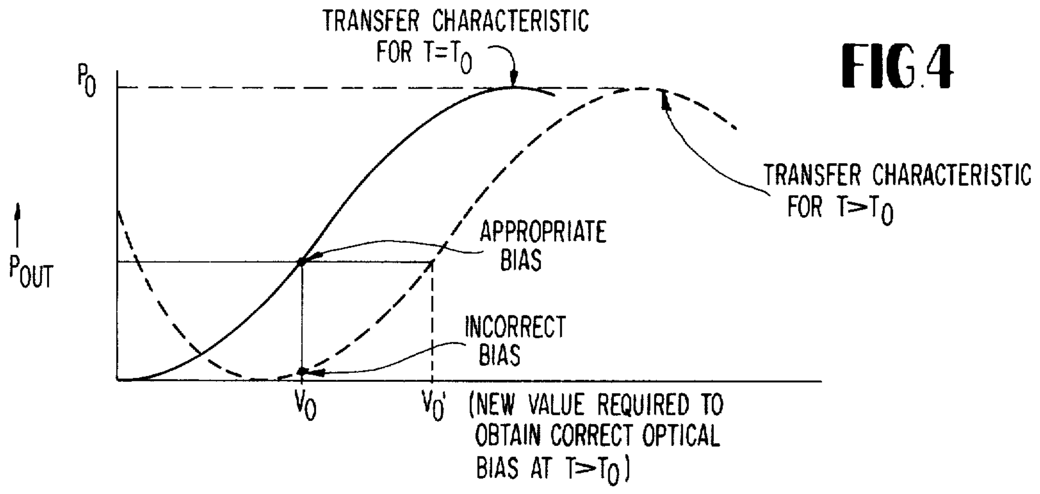
FIG. 4 is a pair of graphs illustrating the change in bias due to a shift in the transfer characteristic of the electro-optic crystal.

In order to obtain reliable high quality IM/FM operation, it is essential not only that the typical operating point on the transfer characteristic be chosen properly but also that it be maintained stable for all operating conditions. In practice, such links must operate over a wide temperature range (typically −20°F to +140°F) and are subject to minor mechanical shocks and realignments. Under such conditions, the transfer characteristic often shifts so drastically that what was considered to be the optimum biasing voltage at 70°F may turn out to be completely inappropriate at 20°F. This situation is illustrated by the graphs of FIG. 4 which show the change in bias due to a shift in the transfer characteristic as represented by the dotted curve.

First of all we address ourselves to the question of what constitutes the best bias voltage. Then we describe the means for maintaining the best bias voltage.

The transfer characteristic of the modulator is given by $$(1) \quad P_{out} = P_0 \sin^2 (\pi/2)\,(V/V_{\lambda/2})$$

where $P_{out}$ is the modulated output power, $P_0$ is the initial laser power, $V$ is the modulator drive voltage and $V_{\lambda/2}$ is the modulator halfwave voltage.

Let us consider a sinusoidal information ($V_p \sin\omega t$) signal to be transmitted. The modulator voltage will then be $$(2) \quad V = V_0 + V_p \sin\omega t$$

where $V_0$ is a d.c. voltage used to properly bias the modulation for optimum transmission.

If we expand Equation 1 into its Fourier component we have $$(3) \quad P_{out} = P_{ave} + \sum_i P_i \sin i\omega t + \sum_j P_j \cos j\omega t$$

where $P_{ave} = P_0/2\ [1 - \cos\alpha J_o(\beta)]$ $$P_i = P_o \sin\alpha J_i(\beta) \qquad i = 1,3,5$$
$$P_i = 0 \qquad i = 2,4,$$
$$P_j = -P_o \cos\alpha J_j(\beta) \qquad j = 2,4$$
$$P_j = 0 \qquad j = 1,3,5$$

with $\alpha = \pi V_o / V_{\lambda/2}$ and $\beta = \pi V_p / V_{\lambda/2}$.

Since $V_p$ sinωt really represents the carrier in an IM/FM system only the fundamental term in Eq. 3 is of importance for information transmission. It is assumed that the higher terms would be filtered after detection at the receiver. Thus we have $$4\ P_{out} = P_{ave} + \text{information} = (P_0/2)\,[1 - \cos\alpha J_0(\beta)] + P_0 \sin\alpha J_i(\beta) \sin\omega t$$

The bias voltage ($V_0$) determines the value of sinα and therefore determines the amount of optical power in the information signal. Indeed if $V_o = 0$ then $\sin\alpha = 0$ and there is no information transmitted. Clearly this shows that the optical bias must be controlled. The next question is to determine the optical bias for optimal transmission.

The optimum value of $V_0$ is that which makes the received signal power to noise (S/N) ratio the maximum. The value of $V_o$ which does this varies depending whether the noise is primarily of thermal origin or whether it is photo-electron noise.

It can be shown that if the noise is of thermal origin, then S/N is maximum for $V_0 = V_{\lambda/2}/2$ but the situation is more complicated for the shot noise limited case.

Nevertheless it can be shown that under such circumstances $$S/N \alpha P_o / 2A(\alpha,\beta).$$

where $A(\alpha,\beta) = 4 \sin^2\alpha J_1^2(\beta) / [1 - \cos\alpha\, J_0(\beta)]$.

Generally information drive signal voltage has a specific value determined by the system electronics and in most cases it is very much smaller than $V_{\lambda/2}$, i.e., $V_p/V_{\lambda/2} << ½$. This being the case, we would like to set $V_0$ so that $A(\alpha,\beta)$ and therefore $S/N$ are maximum for a given $V_p$. This can be done, and the result is that we have a definite relationship between $V_0/V_{\lambda/2}$ and $V_p/V_{\lambda/2}$.

Once the operating point or the average light intensity has been chosen, it is essential that the light intensity be maintained at that level. However this does not mean that the applied bias voltage $V_0$ need to be maintained constant. Indeed as mentioned previously, because changes in temperature or mechanical shocks and/or newly induced optical misalignments, the average light intensity may increase or decrease drastically as applied bias voltage remains constant. This is especially true of electro-optic modulators operating in transverse electrode configuration with two or four "matched" crystals arranged to cancel out residual birefrigences. However, this may also be true of other types of crystal modulators. The important point being that the electro-optic transfer characteristic may shift drastically in one direction or the other, so drastically that the voltage required to maintain the light intensity at the initial desired level may be impossibly large.

We have found a method for maintaining the average light intensity at an initial desired level regardless of how large an excursion the electro-optic crystal transfer function might make in the direction of the average axis. There are two aspects to this bias control method: 1) when it operates as a small signal proportional control system and 2) when the control voltage reaches the maximum value and it is still insufficient to increase the average light level to the desired value.

Figure 5:
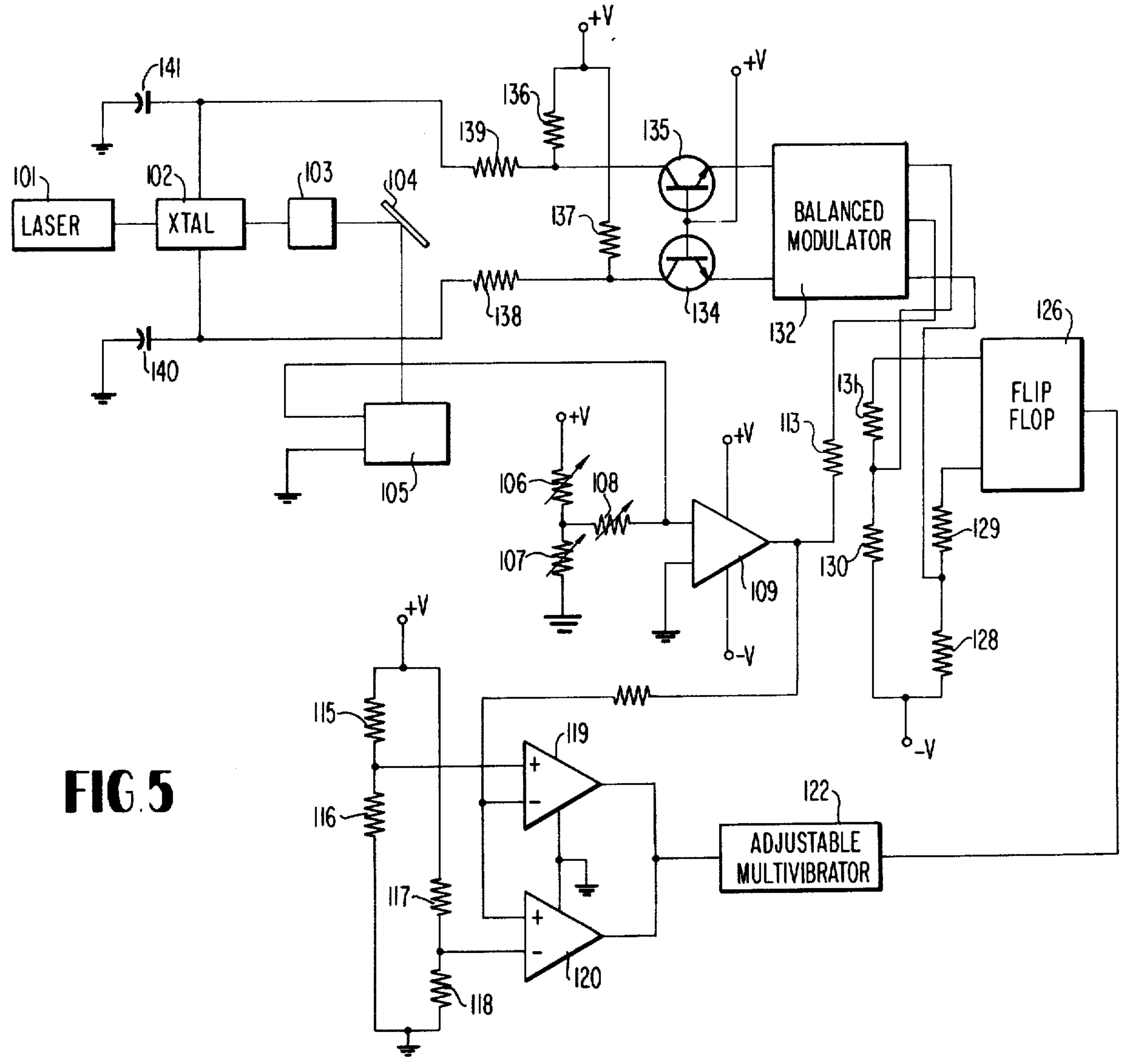
FIG. 5 is a schematic and block diagram of the optical bias stabilization circuit according to the teaching of the invention.

Referring to FIG. 5, we see that in an IM/FM transmitter of this type, laser light 101 passes through an electro-optic crystal 102 and through an analyzer 103. The light which emerges from the analyzer is still linearly polarized but the amplitude varies as the signal voltage on the electro-optic crystal is varied. A portion of the modulated light is split off using beam splitter 104 and is detected with photodetector 105. The current from the photodetector is linearly proportional to the instantaneous light intensity.

Considering the case when the crystal transfer characteristic shifts to the point that the output error signals exceeds the reference level set by resistive voltage dividers 115 and 116, 117 and 118, the mode of operation is as follows: An excursion of the order of one volt at the output of operational amplifier 109 will typically fall outside of the range of linear control. When this occurs, the combined signal output of the differential amplifiers 119 and 120 will rise to a level which will activate the timer circuit 122, such that the timer produces a string of periodic pulses at a predetermined rate. This string is delivered from the output of the timer to a flip-flop 126 whose function is to present a square wave voltage output and a complement to the output. The outputs of the flip-flop 126 derived by resistive voltage dividers 128 and 129, 130 and 131, respectively, actuates a current switch in the balanced modulator 132. In this way, periodically the current will be switched between the emitters of transistors 134 and 135 so that the voltage applied to the crystal 102 will be reversed in sign while its magnitude is maintained constant. This then allows the feedback loop to track over an extremely large range of crystal characteristic without requiring excessively high voltages to be handled by the circuitry.

A unique, unusual feature of the bias control system is the scheme devised to enable the system to handle any excursion of the transfer characteristic without necessity of having the ability to impose arbitrarily large bias voltages on the electro-optic crystal. The essence of this extra feature lies in the ability to reverse polarity of the voltage on the crystal 102 without changing the absolute magnitude of the voltage. To understand this operation we reexamine the linear control function of the feedback loop as explained in the previous paragraph. Operational Amplifier 109 provides amplification of the difference of the current signal from the photo detector 105 and a reference current set by the resistors 106, 107, and 108. The output of amplifier 109 is continually monitored by a dual comparator comprising parallel differential amplifiers 119 and 120. This dual comparator serves the purpose of comparing the magnitude and polarity of the output of the operational amplifier 109 to reference levels set by voltage dividers comprising resistors 115 and 116 and resistors 117 and 118. These reference levels define the limits of the control range of the overall feedback loop. Assuming the absolute value of the output of operational amplifier 109 is smaller than the absolute values of the reference levels provided to the differential amplifiers 119 and 120, the system timer 122, comprising an astable multivibrator, is deactivated. In this mode of operation any error signal is sent through resistor 113 to the input of the balanced modulator 132.

The reference voltage and resistors 106, 107, and 108 provide a fixed, but adjustable, current to operational amplifier 109. The difference between this current and the photodetector current is amplified and applied to the input of balanced modulator 132 through resistor 113. The voltage delivered to the crystal 102 is the difference between the collector voltages of transistors 134 and 135. This difference voltage is developed by the voltage dividers comprising resistor 136 in series with the collector to emitter resistance of transistor 134 and resistor 137 in series with the collector to emitter resistance of transistor 135. The conduction and hence the collector to emitter resistances of transistors 134 and 135 is controlled by the outputs of balanced modulator 132 which will be described in more detail hereinafter. The collectors of transistors 134 and 135 are connected by way of respective voltage dividers comprising resistor 138 and capacitor 140, and resistor 139 and capacitor 141 to supply the bias voltage to crystal 102.

When the system power is turned on, the input voltage to the balanced modulator 132 is sufficient to unbalance the collector voltages of transistors 134 and 135 and thereby set the initial operating point of the crystal 102. The system then tracks as a proportional controller for any changes in light intensity caused by changes in crystal temperature or any other cause. In other words, if as in FIG. 4, the optical bias, and the resulting light intensity, is decreased due to a shift of the crystal characteristic to the right, then the difference between the fixed current and the photodetector current is increased. This in turn increases the voltage across the crystal 102 until the predetermined current difference is again obtained to restore the optimum bias.

Figure 6:
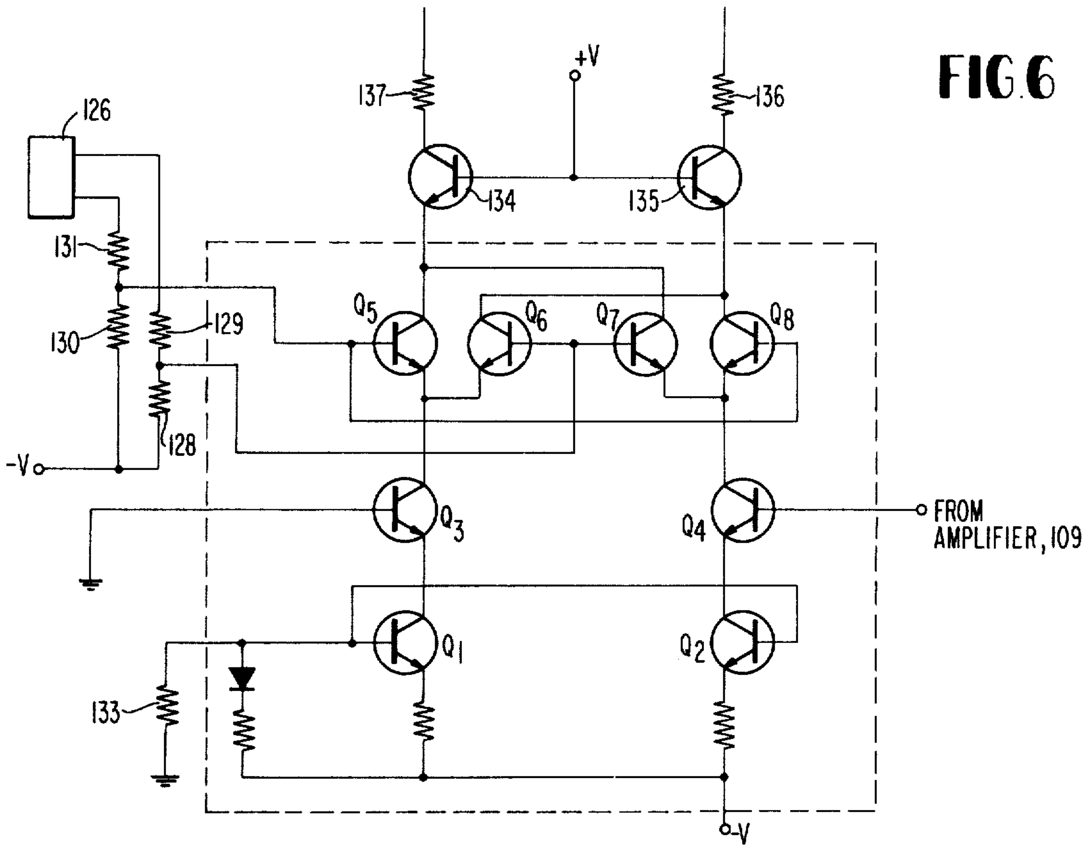
FIG. 6 is a schematic diagram of a balanced modulator suitable for use in the circuit shown in FIG. 5.

The operation of the balanced modulator 132 can best be explained with reference to FIG. 6. The error signal from operational amplifier 109 is presented to the base of transistor Q4 which is one of an identical pair of transistor amplifiers formed by transistors Q3 and Q4. The base of transistor Q3 is returned to ground and under the condition that a zero error signal is applied to the base of transistor Q4, the current through transistors Q3 and Q4 will be identical and will be set by the value of resistor 133 connected to the bases of transistors Q1 and Q2 connected in the emitter circuits of transistors Q3 and Q4, respectively. The emitters of transistors Q3 and Q4 are shorted together so as to provide maximum gain of the modulator. Depending upon the magnitude of the voltage applied to the bases of transistors Q5 and Q7, Q6 and Q8, either Q5 or Q6 and either Q7 or Q8 will be in a conducting state. For example, if the voltage at resistive voltage divider 130, 131 is above ground by at least 0.7 volts and voltage at resistive voltage divider 128, 129 is at zero, then transistors Q5 and Q8 will be in conduction while transistors Q6 and Q7 are non-conducting. In this case the current that flows through transistor Q3 will be supplied through the emitter of transistor 134 while the current that flows through transistor Q4 will be supplied through the emitter of transistor 135. This current is supplied externally through transistors 134 and 135 and resistors 136 and 137 connected to the high voltage crystal bias power supply. The voltage applied to the crystal is set by the difference of the voltages dropped across resistors 136 and 137 from the bias power supply. If resistors 136 and 137 are of equal value and currents through transistors Q3 and Q4 are equal then there will be zero voltage supplied to the crystal. As the output error signal from operational amplifier 109 increases, then the signal delivered to the base of transistor Q4 will show deviation from that of the base of transistor Q3 and the currents between transistors Q3 and Q4 will be of different magnitudes causing the voltage drop across resistors 136 and 137 to be unequal. This inequality then develops the bias supplied to the crystal 102.

Figure 7:
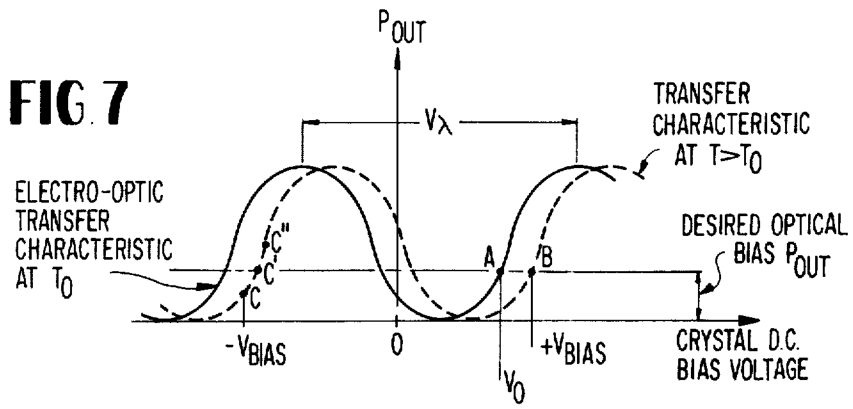
FIG. 7 is a graphical illustration of the principle of operation of the circuit shown in FIG. 5.

The polarity reversal on the crystal terminals enables the control system to find a stable operating point on a positive transfer slope. Once the stable operating point has been attained, the combined output of differential amplifiers 119 and 120 goes low, deactivating timer 122, and leaving the emitters of transistors 134 and 135 in a reversed position. The quantitative features of this reversal feature can be illustrated with the aid of FIG. 7.

In the figure, $V\lambda$ is the crystal full wave voltage, $V_0$ is the actual control or bias voltage on the crystal, $V_{BIAS}$ is the maximum value of $V_0$, A is the operating point at temperature $T_0$ and B is the operating point at the limit of the control range, i.e., $V_0 = V_{BIAS}$. If $V_{BIAS} = V\lambda_{/2}$, then polarity reversal would place the operating point at C' which is unstable because it is the "same" power output as at B. If $V_{BIAS} \leq V\lambda_{/2}$, then the operating point would be at C'', and control is not possible. If $V_{BIAS}$ is slightly larger than $V\lambda_{/2}$, then the bias point shifts to a point slightly below C. A decrease then of the absolute value of $V_0$ would increase the power output. Thus, we see that for an optical bias $P_{opt}<½P_0$, then $V_{BIAS}$ should be less than $V\lambda_{/2}$, but it should not be very large otherwise the initial operating point will correspond to too low an intensity immediately after reversal.

The embodiment described in the preceeding sections illustrates but one example of the general technique. Other variations are obvious and are included in our teaching. The optical bias might, for example, be set greater than $½P_0$ instead of less than $½P_0$ as it was in the foregoing description. Similarly, one might elect to control on the negative slope of the transfer characteristic instead of the positive.

In addition, the basic bias control system might also be used together with a simple temperature controller instead of a polarity reversing circuit. The system is only slihgtly more complicated but just as reliable and almost as economical. In this latter scheme, a slowly varying temperature controller is used to supplement the more rapid electronic controls.

Two pairs of differential amplifiers acting as voltage window detectors with a hysterises latch are used in this latter scheme. The optimum crystal temperature is determined, and the crystal oven control is set so that the optimum temperature is attained. The d.c. bias voltage which gives the optimum optical bias is then determined. In some circumstances, the "optimum" crystal temperature may have to be changed somewhat to yield a convinently low $V_0$ bias voltage.

Figure 8:
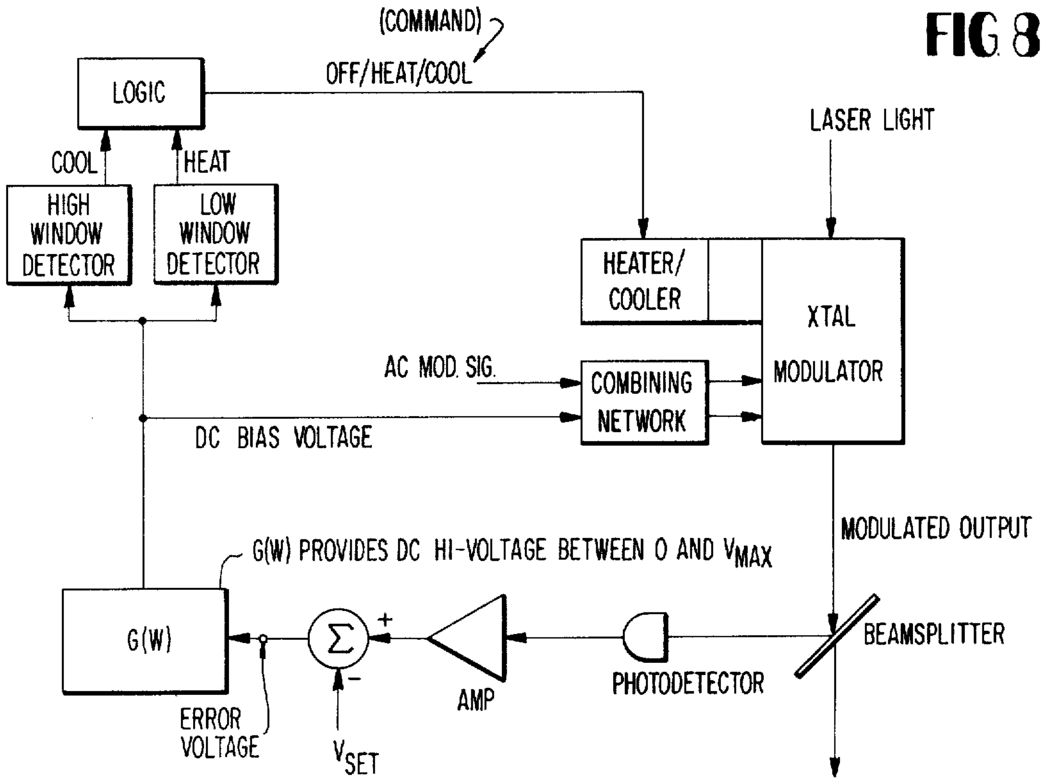
FIG. 8 is a simplified block diagram illustrating a modification to the bias circuit of FIG. 5 including a simple temperature control system.
Figure 8A:
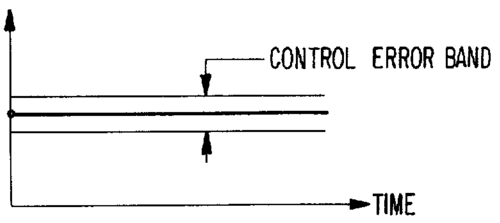
FIGS. 8A, 8B and 8C are graphs illustrating the operation of FIG. 8.
Figure 8B:
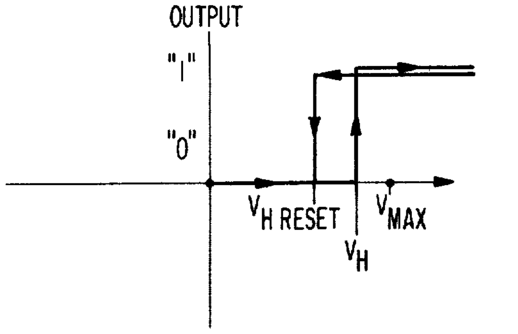
Figure 8C:
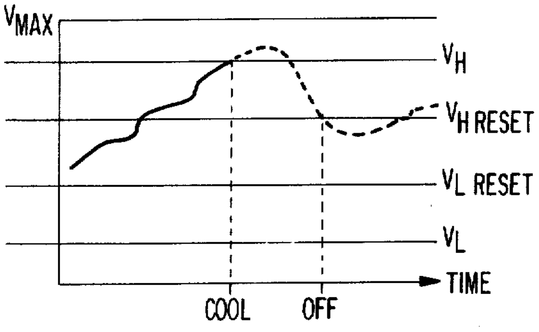

As shown in FIG. 8, the window detectors are set such that cooling is not called for until the d.c. bias voltage reaches value $V_H$. Cooling is sustained until the voltage $V_0$ begins to be below $V_H$ reset at which time, cooling is discontinued. Similarly on the lower side of $V_0$ initial heating is triggered once $V_0$ goes below $V_L$ and heating is sustained until $V_0$ is greater than $V_L$ reset. At all times, regardless of whether the crystal is being heated or cooled (this could be by radiation) or not, the electronic control maintains the correct optical bias.

Another very important feature useful in several embodiments of our reliable and economical IM/FM System is the Automatic beam control which insures that a well collimated beam can be employed and that most of the energy of the optical beam can be placed on the receiver aperture at all times regardless of "beam steering" by gradients in the refractive index of the atmosphere or due to the sway of buildings and/or other types of mounting platforms. Quite unexpectedly, we find that a very simple scheme when implemented appropriately, is capable of fulfilling this control function very well.

Figure 9:
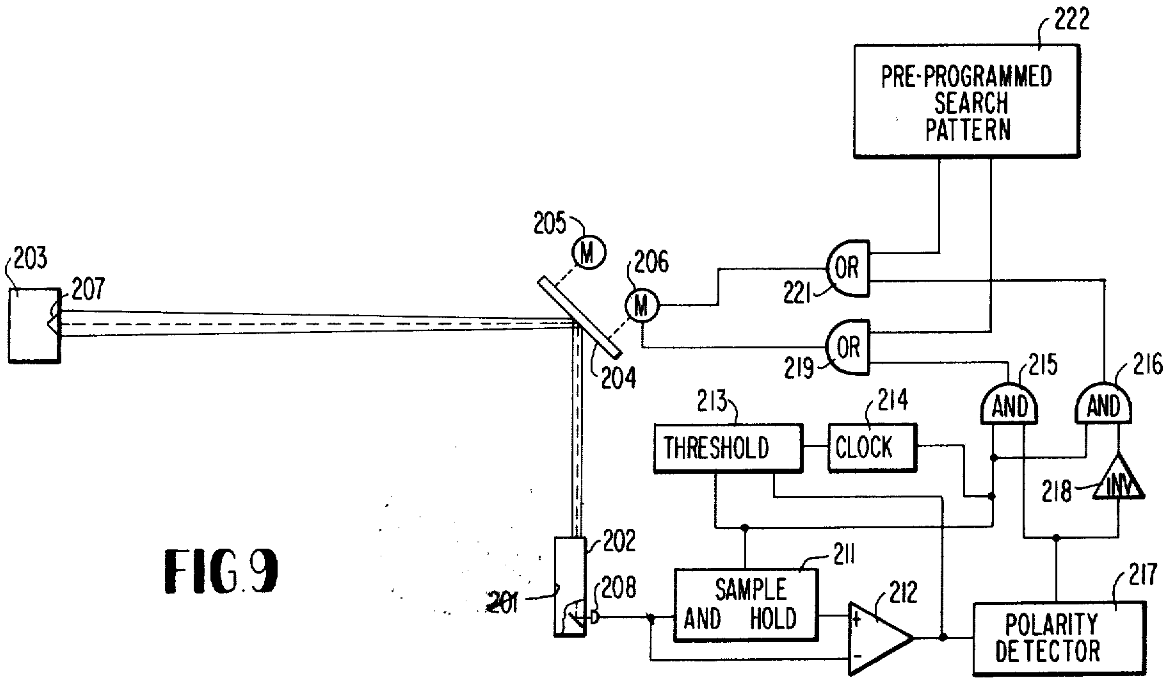
FIG. 9 is a schematic and block diagram of one form of the automatic beam control according to the invention.

The technique is illustrated in FIG. 9. The laser transmitter 201 is equipped with a sighting telescope 202. The output from the laser is directed towards the receiver 203 by means of an mirror 203 which can be tilted horozontally and vertically by means of controls including motors 205 and 206, respectively. The receiver 203 is viewed with the telescope 202 through the mirror 204 and the system is calibrated so that when the center of the receiver aperture is on the cross-hairs of the telescope, the optical beam is optically placed in the receive aperture. The receiver aperture is equipped with a small corner cube reflector 207 at the very center of the aperture obscuring but a very small part of the aperture. This corner cube reflector sends back a minute part of the energy of the optical beam and a part of this is collected by the optical system of the telescope 202. A long integration time light detector 208 is attached to the telescope 202 and therefore senses when the beam is on the aperture and when it is not. An optical filter is placed before the photodetector or 208 to prevent it from being confused by other optical sources. Electronic filters may also be used to prevent it from being confused by other sources of the same wavelength but without subcarrier modulation.

The control cycle is started by the initial placing of the beam on the aperture (by manual adjustment of the mirror controls). A signal level for the output of the control photodetector is measured and is stored at peak value.

Nothing happens until the return signal level varies by as much as (say) 5 percent from the original value. This variation may either be an increase or a decrease. When this happens, a "local search pattern" sequence of signals is initiated. The local "maximum" is determined and the mirror is positioned automatically in that direction. The control system then stores the local "maximum" value as the peak value and deactivates. Nothing happens until the return signal decreases or increases by more than 5 percent of the peak value. In the event that the beam is lost momentarily due to accidental obscuration of the beam, the search pattern might initially take the beam so far off the correct direction that no return signal is detected. The logic of the search pattern is nevertheless so set that the entire permissible solid angle is scanned and the correct direction is recovered.

One possible implementation of the "local search pattern" may be the form of a digital feedback loop as shown in FIG. 9. Only one axis is illustrated for the sake of clarity, but it will be understood by those skilled in the art that two identical feedback loops are required for control of both horizontal and verticle deflection of the beam. Once the telescope 202 has been initially aligned, the sample and hold circuit 211 stores the return signal level. Thereafter, the stored signal is compared with the current return signal in differential amplifier 212. When the absolute value of the output of amplifier 212 exceeds a predetermined threshold as detected by threshold circuit 213, clock 214 is gated on causing a new return signal level to be stored by the sample and hold circuit 211. Simultaneously, AND gates 215 and 216 are gated open. AND gate 215 has one input connected directly to the output of polarity detector 217, while AND gate 216 is connected to the output of polarity detector 217 through inverter 218. The outputs of AND gates 215 and 216 are connected through respective OR gates 219 and 221 to the increment and decrement inputs to a digital stepping motor 206, for example, it being understood that a similar feedback circuit is required for motor 205.

In operation, during each clock pulse from clock 214, the stored and the current return signals are compared. Depending on the polarity of the output of differential amplifier 212, polarity detector 217 provides a binary "1" or a binary "0+ output. Thus, the output of polarity detector 217 serves to steer the clock pulses from clock 214 to the increment on decrement inputs of motor 206.

If the beam is lost entirely, then pulses are fed to the increment and decrement inputs of the stepping motor 206 through OR gates 219 and 221 by logic generally indicated at 222 which provides a preprogrammed search pattern that scans the entire permissible solid angle. For this purpose, a well known spiral scan, modified an an incremental step-wise scan, may be employed.

While the invention has been particularly shown and described with reference to the preferred embodiment thereof, it will be understood by those skilled in the art that various changes in form and details may be made therein without departing from the spirit and scope of the invention as defined in the appended claims.

Also, even though the above invention has been discussed with reference to bad weather conditions, it is to be understood that the utility of the invention applies also to other media such as water and light pipes where absorption and refractive index are subject to changes with time.

We claim:

1. An optical information transmission system comprising:

a. an information signal source;

b. a radio frequency signal source producing a subcarrier signal having a frequency below the microwave range;

c. means responsive to the information signal and to the subcarrier signal for angle modulating the subcarrier with the information signal;

d. a light beam source;

e. intensity modulator means responsive to the light beam and to the modulated subcarrier signal for intensity modulating the light beam in accordance with the modulated subcarrier signal, said modulator means including an electro-optic crystal;

f. means for transmitting the intensity modulated light beam through a medium; and g. bias control means connected to said electro-optical crystal for providing small signal proportional control to the operating bias of the crystal and, when the control voltage reaches a maximum value, for reversing the polarity of the operating bias at the crystal.

2. The system as defined in claim 1 wherein said light beam source comprises a laser.

3. The system as defined in claim 1 wherein said light beam source comprises an incoherent light beam source.

4. The system as defined in claim 1 wherein said bias control means includes:

a. photo-detector means for generating a signal proportional to the light transmitted by said crystal;

b. comparator means for comparing the photo-detector signal to a reference signal level and generating a difference signal;

c. proportional control means responsive to said difference signal for changing the bias on said crystal in a manner to minimize said difference signal;

d. absolute value detecting means responsive to said difference signal for generating an output when the absolute value of said difference signal exceeds a predetermined maximum; and e. polarity reversal means responsive to the output of said absolute value detecting means for reversing the polarity of the bias on said crystal.

5. The system as defined in claim 1 further comprising thermal means connected to said bias control means and responsive thereto for controlling the operating temperature of said crystal.

6. The system as defined in claim 1 further comprising receiver means for detecting the analog information signal in the transmitted light beam.

7. The system as defined in claim 6 further comprising automatic beam control including:

a. reflector means located at said receiver means for reflecting a portion of the received light beam;

b. detector means located at said transmitting means for detecting said portion of the reflected light from said receiver means; and c. servo means responsive to said detector means for controlling the alignment of said transmitting means with said receiving means so as to maintain said light beam in alignment with said receiving means.

8. The system as defined in claim 7 wherein said transmitting means includes an adjustable mirror rotatably movable about horizontal and vertical axes and said light beam is deflected toward said receiving means by said mirror, and wherein said servo means includes both horizontal and vertical controls of said mirror.

9. The system as defined in claim 7 wherein said detector means includes filter means for eliminating signals without subcarrier modulation.

10. The system as defined in claim 7 further comprising:

a. storage means connected to said detector means for storing an initial peak signal value corresponding to an initial alignment of the light beam; and b. threshold means responsive to said detector means and said storage means for activating said servo means when the difference between the output signals of said detector means and said threshold means exceeds a predetermined threshold.

11. In an optical information transmission system of the type wherein a light beam is intensity modulated by a subcarrier signal impressed on an electro-optic crystal, a bias control circuit connected to said electro-optic crystal comprising:

a. photo-detector means for generating a signal proportional to the light transmitted by said crystal;

b. comparator means for comparing the photo-detector signal to a reference signal level and generating a difference signal;

c. proportional control means responsive to said difference signal for changing the bias on said crystal in a manner to minimize said difference signal;

d. absolute value detecting means responsive to said difference signal for generating an output when the absolute value of said difference signal exceeds a predetermined maximum; and e. polarity reversal means responsive to the output of said absolute value detecting means for reversing the polarity of the bias on said crystal.

12. The circuit as defined in claim 11 further comprising thermal means connected to the output of said absolute value detecting means and responsive thereto for controlling the operating temperature of said crystal.

* * * * *